(12) United States Patent
Ma et al.

(10) Patent No.: US 11,520,443 B2
(45) Date of Patent: Dec. 6, 2022

(54) TOUCH DISPLAY PANEL AND TOUCH DISPLAY DEVICE

(71) Applicant: XIAMEN TIANMA MICRO-ELECTRONICS CO., LTD, Xiamen (CN)

(72) Inventors: Yangzhao Ma, Xiamen (CN); Baoling Chen, Xiamen (CN); Boping Shen, Xiamen (CN); Ling Wu, Xiamen (CN)

(73) Assignee: XIAMEN TIANMA MICRO-ELECTRONICS CO., LTD, Xiamen (CN)

( * ) Notice: Subject to any disclaimer, the term of this patent is extended or adjusted under 35 U.S.C. 154(b) by 0 days.

(21) Appl. No.: 16/449,225

(22) Filed: Jun. 21, 2019

(65) Prior Publication Data

US 2020/0210027 A1    Jul. 2, 2020

(30) Foreign Application Priority Data

Dec. 28, 2018  (CN) .......................... 201811621846.1

(51) Int. Cl.
*G06F 3/044* (2006.01)
*G06F 3/041* (2006.01)
*G02F 1/1343* (2006.01)
*G02F 1/1333* (2006.01)

(52) U.S. Cl.
CPC ...... *G06F 3/0443* (2019.05); *G02F 1/134309* (2013.01); *G06F 3/0412* (2013.01); *G06F 3/0448* (2019.05); *G06F 3/04166* (2019.05); *G02F 1/13338* (2013.01); *G02F 2201/121* (2013.01); *G02F 2201/123* (2013.01); *G02F 2201/56* (2013.01)

(58) Field of Classification Search
CPC .......... G06F 3/041; G06F 2203/04111; G06F 2203/04107; G06F 3/0446; G06F 3/0443; G06F 3/0448; G06F 3/04164; G06F 3/0412; G06F 3/0416; G06F 3/044
See application file for complete search history.

(56) References Cited

U.S. PATENT DOCUMENTS 10,296,133 B2 *  5/2019  Meng .................... G06F 3/0448
10,488,966 B2 * 11/2019  Rhe ......................... G06F 3/044
10,585,452 B2 *  3/2020  Park ...................... G06F 1/1652
(Continued)

FOREIGN PATENT DOCUMENTS

| CN | 104699348 A | 6/2015 |
| CN | 105094495 A | 11/2015 |
| CN | 107315500 A | 11/2017 |

*Primary Examiner* — Michael J Jansen, II
(74) *Attorney, Agent, or Firm* — Alston & Bird LLP

(57) ABSTRACT

A touch display panel and a touch display device are provided. The touch display panel has a display region and a non-display region arranged on a periphery of the display region, and the display region has a non-rectangular shape. The touch display panel comprises a plurality of first touch electrodes and a plurality of second touch electrodes. The plurality of first touch electrodes is arranged in the display region. The plurality of second touch electrodes is arranged at a side of the first touch electrode next to the non-display region. The second touch electrode has a different shape from the first touch electrode. An area of the first touch electrode is S1, an area of the second touch electrode is S2, and S1 and S2 satisfy: $0.85 S1 \leq S2 \leq 1.15 S1$.

20 Claims, 6 Drawing Sheets

(56) References Cited

U.S. PATENT DOCUMENTS

| | | | |
|---|---|---|---|
| 10,691,238 B2* | 6/2020 | Cai | G06F 3/0443 |
| 10,754,464 B2* | 8/2020 | Liu | G06F 3/0445 |
| 10,915,190 B2* | 2/2021 | Gong | G06F 3/0443 |
| 10,936,139 B2* | 3/2021 | Wang | G06F 3/04164 |
| 10,978,666 B2* | 4/2021 | Park | H01L 27/3276 |
| 11,036,342 B2* | 6/2021 | Hwang | G06F 3/0445 |
| 2017/0205850 A1* | 7/2017 | Park | G06F 3/044 |
| 2018/0067599 A1* | 3/2018 | Cai | G06F 3/0448 |
| 2018/0107330 A1* | 4/2018 | Meng | G06F 3/04166 |
| 2018/0348929 A1* | 12/2018 | Rhe | G06F 3/04164 |
| 2019/0204974 A1* | 7/2019 | Gong | G02F 1/13338 |
| 2019/0214595 A1* | 7/2019 | Park | G06F 3/0443 |
| 2019/0258343 A1* | 8/2019 | Hwang | G06F 3/0445 |
| 2019/0377448 A1* | 12/2019 | Liu | G09G 3/3655 |
| 2020/0064955 A1* | 2/2020 | Wang | G06F 3/0412 |
| 2020/0081582 A1* | 3/2020 | Yatsu | G06F 3/0445 |

* cited by examiner

TOUCH DISPLAY PANEL AND TOUCH DISPLAY DEVICE

CROSS-REFERENCE TO RELATED APPLICATIONS

The present disclosure claims priority to Chinese Patent Application No. CN201811621846.1, filed on Dec. 28, 2018, the content of which is incorporated herein by reference in its entirety.

TECHNICAL FIELD

The present disclosure relates to the field of touch display technologies, and, particularly, relates to a touch display panel and a touch display device.

BACKGROUND

Touch electrodes in a touch display are generally designed to be in a rectangular array. At present, the non-rectangular touch display has been more and more widely used. The problem is that the area for touch electrodes in the non-rectangular touch display may exceed the display region if the area of touch electrodes is designed to be rectangular, affecting the display signal transmitted by the signal lines in the periphery region. Therefore, usually the touch electrodes adjacent to the display profile edge have to be specially designed.

FIG. 1 is a schematic diagram showing a touch display panel in the related art. As shown in FIG. 1, a circular touch display screen includes a display region 2 and a non-display region 1 surrounding the display region 2. A circular dotted frame can be regarded as a boundary of the display region 2. A normal touch electrode 4 included in a touch electrode 3 is generally designed to be rectangular. In order to meet the shape of the non-rectangular display region 2, the touch electrode further includes a profiled touch electrode 5. As shown in FIG. 1, a side of the boundary of the profiled touch electrode 5 adjacent to the display region 2 is designed to be arc, such that the profiled touch electrode 5 has a smaller area than the normal touch electrode 4, resulting in inconsistency between the touch sensitivity of the profiled touch electrode 5 and the touch sensitivity of the normal touch electrode 4.

SUMMARY

In view of the above, in a first aspect, the present disclosure provides a touch display panel having a display region and a non-display region arranged on a periphery of the display region and the display region having a non-rectangular shape. The touch display panel includes: a plurality of first touch electrodes and a plurality of second touch electrodes, the plurality of first touch electrodes is arranged in the display region, and the plurality of second touch electrodes is arranged at a side of the plurality of first touch electrodes close to the non-display region. Each of the plurality of second touch electrodes has a different shape from the plurality of first touch electrodes; an area of each of the plurality of first touch electrodes is S1, an area of each of the plurality of second touch electrodes is S2, and S1 and S2 satisfy: $0.85 S1 \leq S2 \leq 1.15 S1$.

In a second aspect, the present disclosure provides a touch display device, and the touch display device includes the touch display panel provided in any embodiment of the present disclosure.

DESCRIPTION OF EMBODIMENTS

In order to make the above objects, features and advantages of the present disclosure more apparent, the present disclosure will be further described below in conjunction with the accompanying drawings and embodiments.

It is to be noted that specific details are set forth in the following description in order to fully understand the present disclosure. However, the present disclosure can be implemented in a variety of other ways than those described herein. Those skilled in the art can make similar promotion without departing from the scope of the present disclosure. The present disclosure is therefore not limited by the specific embodiments disclosed below.

Figure 1:
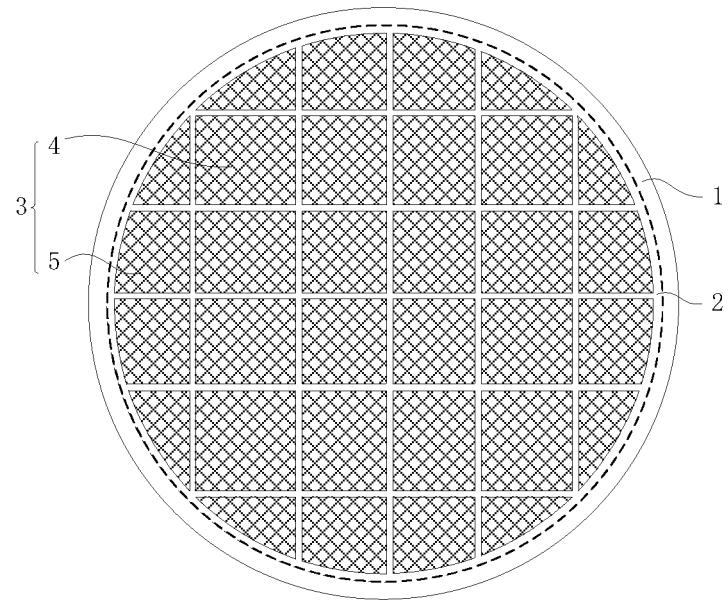
FIG. 1 is a schematic diagram showing a touch display panel in the related art.
Figure 2:
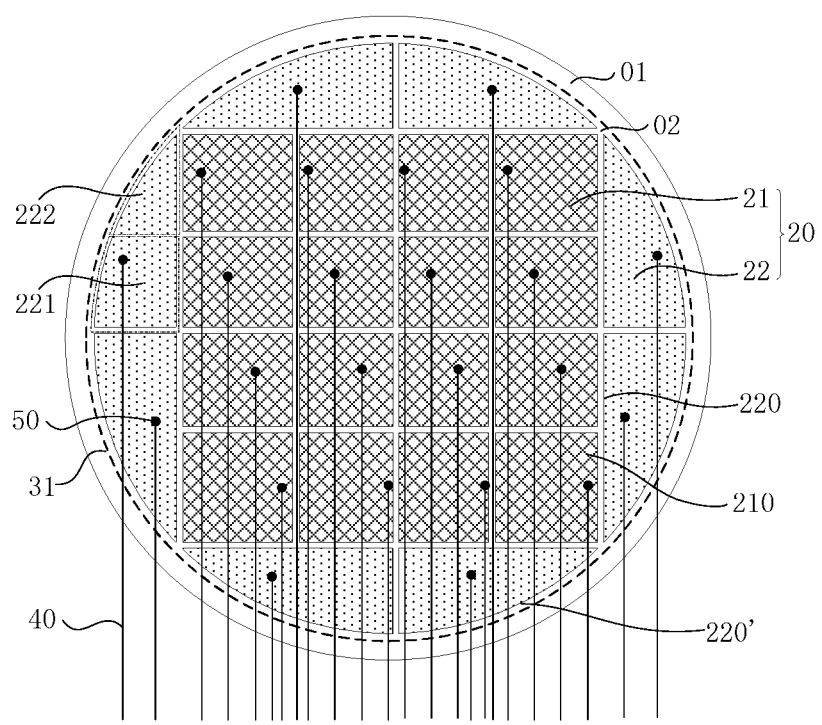
FIG. 2 is a schematic diagram showing a touch display panel according to an embodiment of the present disclosure.
Figure 3:
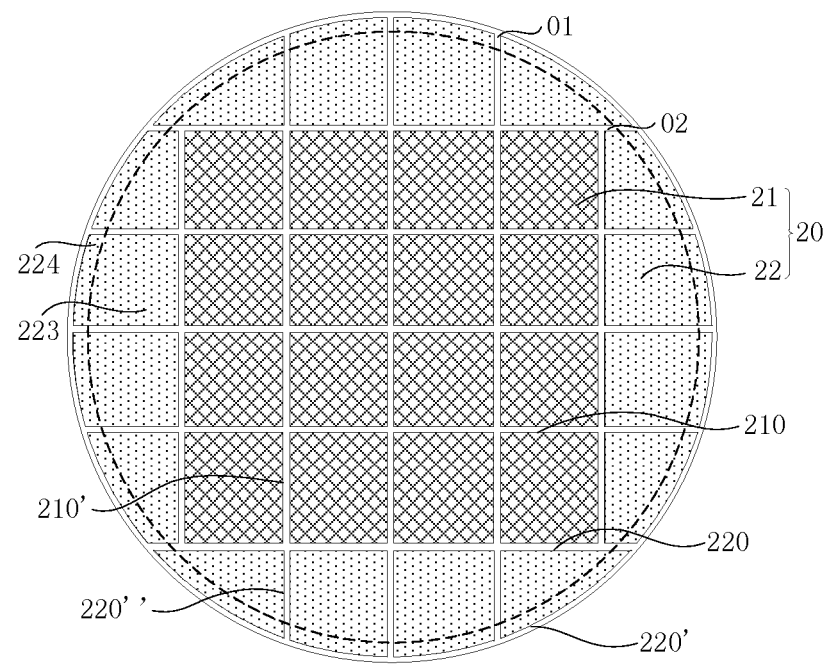
FIG. 3 is a schematic diagram showing a touch display panel according to another embodiment of the present disclosure.

Referring to FIGS. 2 and 3, FIG. 2 is a schematic diagram showing a touch display panel according to an embodiment of the present disclosure; and FIG. 3 is a schematic diagram showing a touch display panel according to another embodiment of the present disclosure. The touch display panel according to an embodiment of the present disclosure is divided into a display region 02 (the portion inside a dotted circular frame as shown in FIGS. 2 and 3) and a non-display region 01 arranged at a periphery of the display region 02 (the portion outside the dotted circular frame as shown in FIGS. 2 and 3). The display region 02 has a non-rectangular shape, that is, the touch display panel according to an embodiment of the present disclosure is a profiled touch display panel. The profiled touch display panel refers to a touch display panel in which the display region 02 has a non-rectangular shape.

Figure 4:
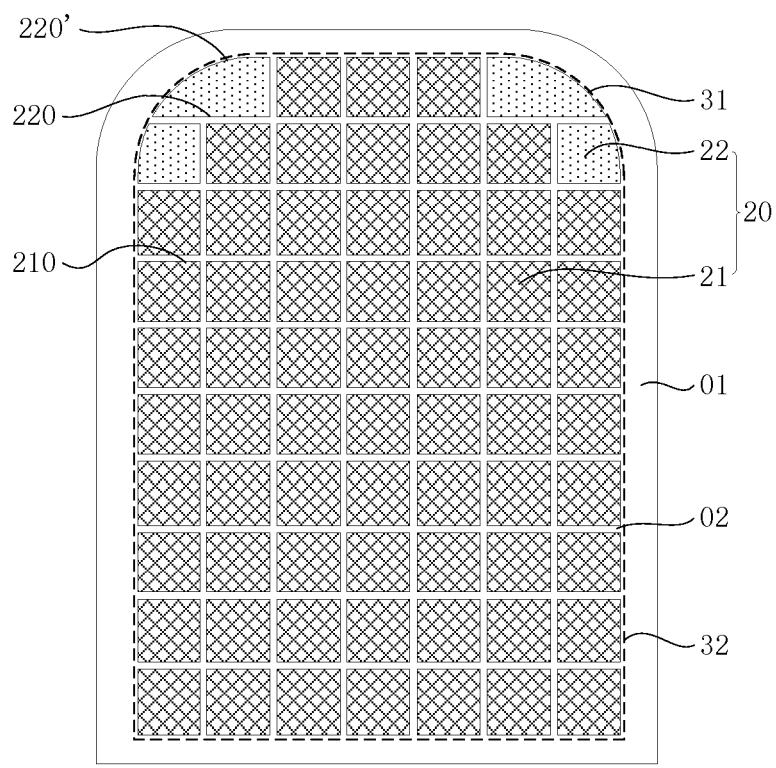
FIG. 4 is a schematic diagram showing a touch display panel according to still another embodiment of the present disclosure.
Figure 5:
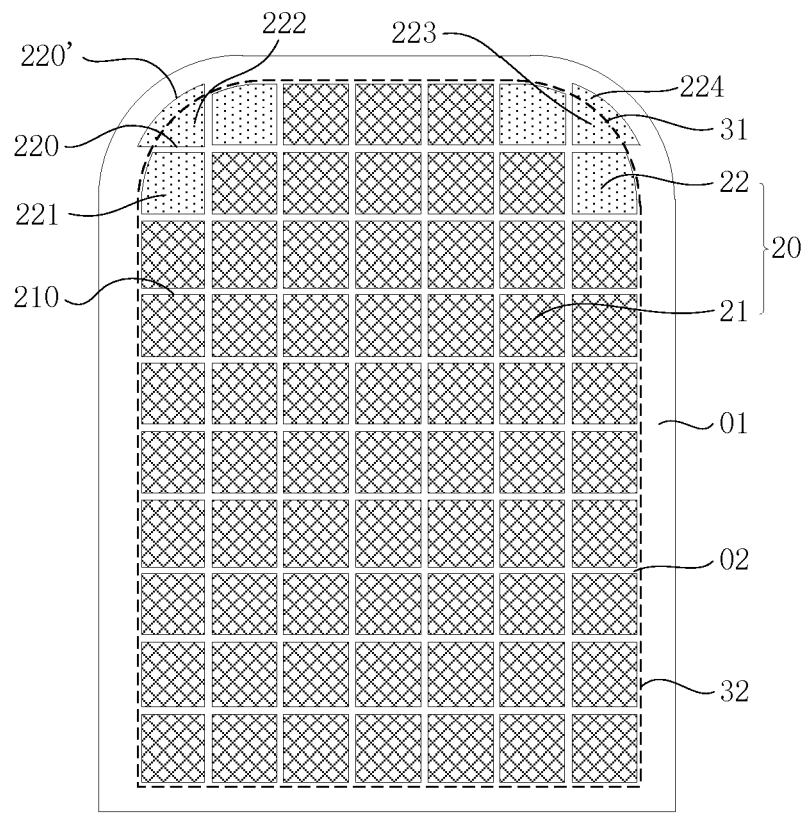
FIG. 5 is a schematic diagram showing a touch display panel according to yet another embodiment of the present disclosure.
Figure 6:
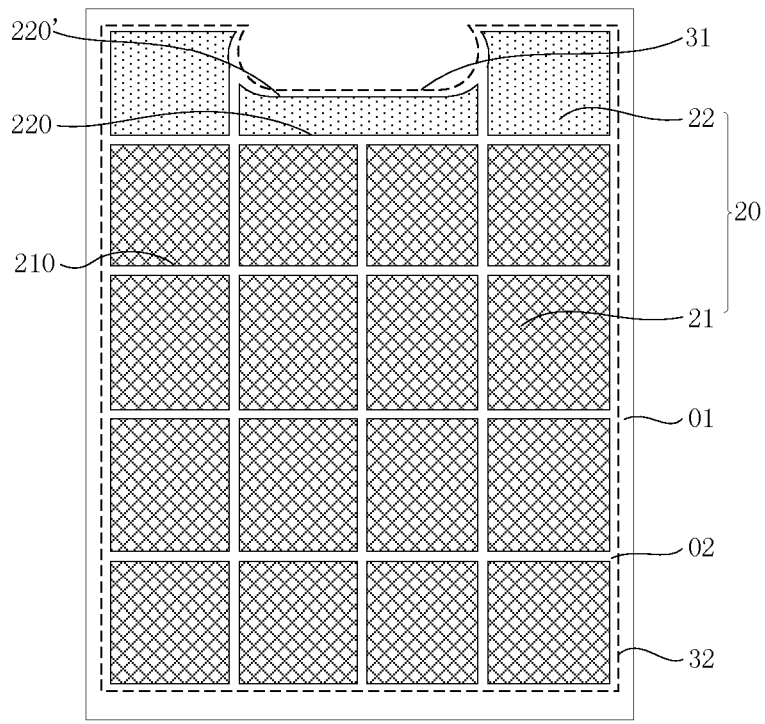
FIG. 6 is a schematic diagram showing a touch display panel according to yet another embodiment of the present disclosure.

In the embodiments of the present disclosure, an edge of the display region 02 of the touch display panel according to the present disclosure includes a non-linear portion. Specifically, the corners of the display region 02 (the portion indicated by a circular dotted frame) may have a curved shape. As shown in FIGS. 2 and 3, the corners of the display region 02 may be circular. It should be noted that the corners of the display region 02 may also be other non-rectangular shapes, such as an ellipse or the other curved. Specifically, the edge of the display region 02 can include both a non-rectangular portion and a rectangular portion. FIG. 4 is a schematic diagram showing a touch display panel according to still another embodiment of the present disclosure; FIG. 5 is a schematic diagram showing a touch display panel according to yet another embodiment of the present disclosure; and FIG. 6 is a schematic diagram showing a touch display panel according to yet another embodiment of the present disclosure. As shown in FIGS. 4 to 6, the corners of the display region 02 of the touch display panel include a non-linear portion 31 and a linear portion 32.

Figure 7:
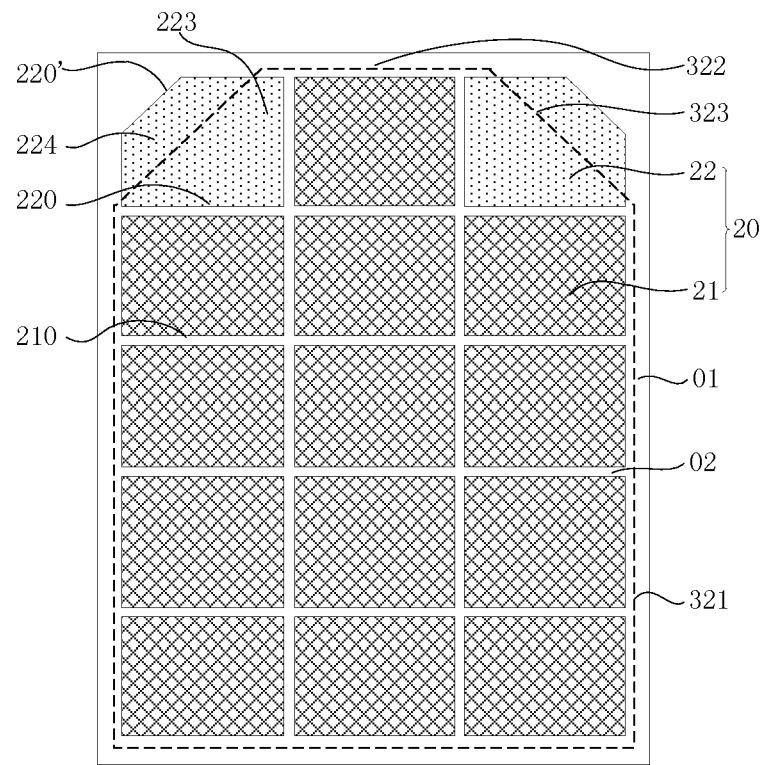
FIG. 7 is a schematic diagram showing a touch display panel according to yet another embodiment of the present disclosure.
Figure 8:
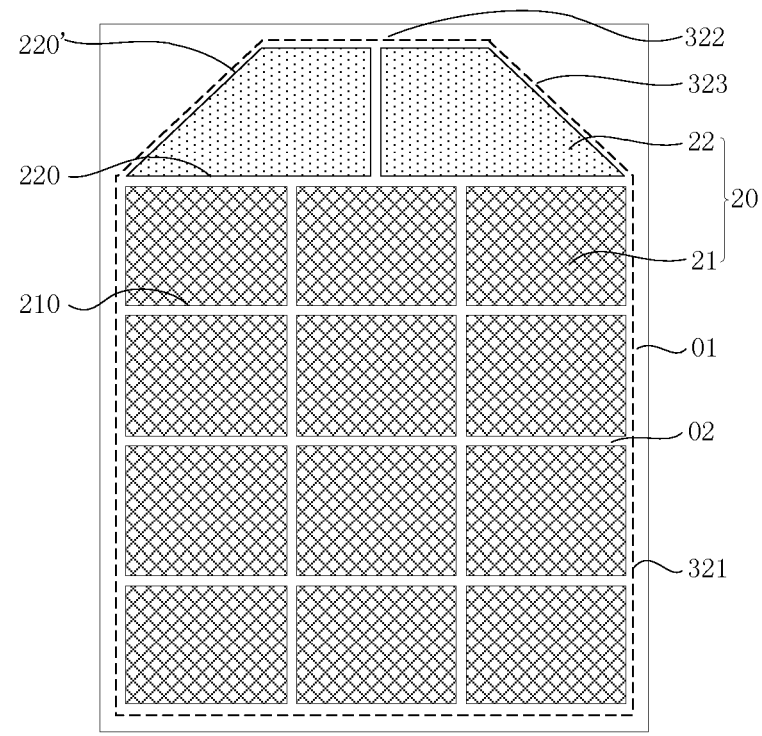
FIG. 8 is a schematic diagram showing a touch display panel according to yet another embodiment of the present disclosure.

In the embodiments of the present disclosure, an edge line of the display region 02 of the touch display panel according to the present disclosure includes, besides the outlines that are perpendicular to each other and the outlines that are parallel to each other, other outlines that are neither parallel nor perpendicular. FIG. 7 is a schematic diagram showing a touch display panel according to yet another embodiment of the present disclosure; and FIG. 8 is a schematic diagram showing a touch display panel according to yet another embodiment of the present disclosure. As shown in FIGS. 7 and 8, the display region 02 includes a first edge 321, a second edge 322, and a third edge 323. The first edge 321 and the second edge 322 are perpendicular to each other. The third edge 323 intersects with both the first edge 321 and the second edge 322. More specifically, as shown in FIG. 7, the first edge 321 is upward and downward, the second edge 322 is leftward and rightward, and the third edge 322 is neither upward and downward nor leftward and rightward.

Figure 9:
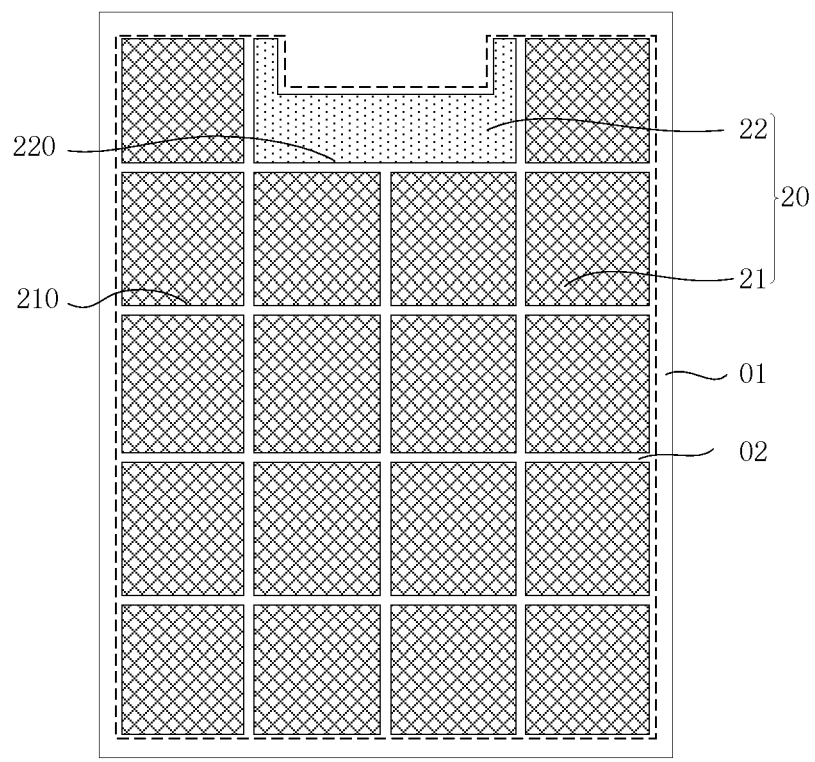
FIG. 9 is a schematic diagram showing a touch display panel according to yet another embodiment of the present disclosure.

It should be noted that the above is only a partial description of the touch display panel according to the present disclosure, and the touch display panel to be protected by the present disclosure is not limited to the case shown in the drawings. FIG. 9 is a schematic diagram showing a touch display panel according to yet another embodiment of the present disclosure. For example, as shown in FIG. 9, the display region 02 is also non-rectangular. Here, the touch display panels according to the present disclosure will not be described one by one.

Figure 10:
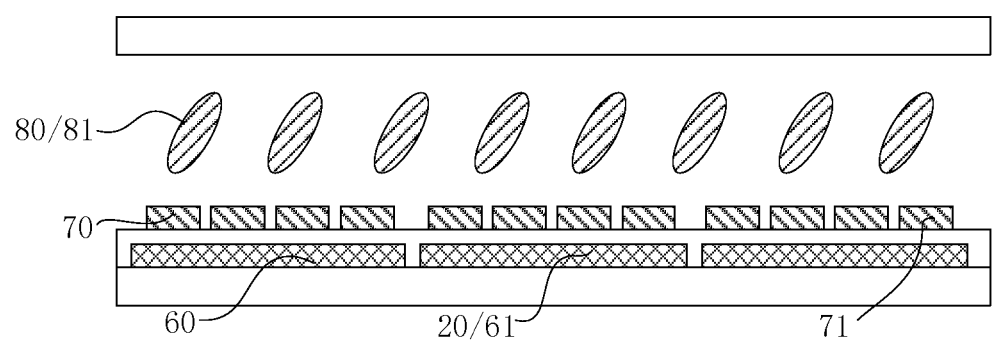
FIG. 10 is a cross-sectional view showing a touch display panel according to an embodiment of the present disclosure.

In order to realize the touch function, the touch display panel includes a plurality of mutually insulated touch electrodes 20 for receiving and/or outputting touch sensing signals. FIG. 10 is a cross-sectional view showing a touch display panel according to yet another embodiment of the present disclosure. Further, referring to FIG. 10, the touch display panel includes a common electrode layer 60, a pixel electrode layer 70, and a liquid crystal layer 80. The common electrode layer 60 includes a plurality of common electrode blocks 61. The pixel electrode layer 70 includes a plurality of pixel electrodes 71. The liquid crystal layer 80 includes liquid crystal molecules 81. In the display phase, the electric field formed by the common electrode block 61 and the pixel electrode 71 drives the liquid crystal molecules 81 to be deflected. In the touch phase, at least some of the common electrode blocks 71 are shared as the touch electrodes 20. Sharing the common electrode blocks 71 as the touch electrodes 20 can reduce the thickness of the touch display panel, reduce the process flow, and reduce the manufacturing cost. It should be noted that FIG. 10 is an exemplary cross-sectional view showing a touch display panel according to an embodiment of the present disclosure. The touch display panel to be protected by the present disclosure is not limited to the touch display panel shown in FIG. 10.

It should be noted that the touch electrodes included in the touch display panel according to the present disclosure may also be separate electrodes which are not reused by other conductive film layers.

Referring to FIGS. 2 to 9, in order to adapt to the non-rectangular design of the touch display panel, the shapes of the touch electrodes 20, especially the touch electrodes 20 near the edge of the display region 02 of the touch display panel, may be designed corresponding to the edges of the display region 02. In other words, a plurality of mutually insulated touch electrodes 20 included in the touch display panel may include a plurality of first touch electrodes 21 and a plurality of second touch electrodes 22. The plurality of first touch electrodes 21 is arranged in the display region 02, and the plurality of second touch electrodes 22 is arranged at a side of the first touch electrode 21 near the non-display region 01.

It should be noted that the expression "the plurality of first touch electrodes 21 is arranged in the display region 02" means that each of the plurality of first touch electrodes 21 is fully located in the display region 02.

It should be noted that the expression "the plurality of second touch electrodes 22 is arranged at a side of the first touch electrode 21 near the non-display region 01" means that each second touch electrodes 22 has some part located in the non-display region.

In the embodiments of the present disclosure, as shown in FIGS. 2, 4, 6 and 8, all of the second touch electrodes 22 are arranged in the display region 02 and are located partially outside one edge of the display region 02, that is, the second touch electrode 22 is arranged in the display region. Specifically, as shown in FIGS. 2, 4, and 6, the edge of the display region 02 includes a non-linear portion 31. The second touch electrode 22 is adjacent to the non-linear portion 31 and is located in the region enclosed by the edge of the display region 02. Specifically, as shown in FIG. 8, the display region 02 includes a first edge 321, a second edge 322, and a third edge 323. The first edge 321 is perpendicular to the second edge 322. The third edge 323 intersects with the first edge 321 and the second edge 322. The second touch electrode 22 is on the third edge 323. In summary, the second touch electrode 22 is at the profiled position being cut, i.e., the second touch electrode 22 is smaller than by being at of the edge the inner side of the display region 02. At this time, the second touch electrode 22 will not go out of the display region 02, which may affect the signal on the signal line arranged at the non-display region 01. Meanwhile, the width of the non-display region is not affected, therefore it is easy to realize a narrow border design.

In the embodiments of the present disclosure, as shown in FIGS. 3, 5 and 7, at least a part of the second touch electrodes 22 includes a first portion 223 arranged in the display region 02 and a second portion 224 arranged in the non-display region 01. Specifically, all of the second touch electrodes 22 included in the touch display panel each include a first portion 223 and a second portion 224. The first portion 223 and the second portion 224 of any one of the second touch electrodes 22 are respectively located in the display region 02 and non-display region 01. As shown in FIG. 5, the outline 31 of the display region 02 non-linear. Any one of the second touch electrodes 22 overlaps with the non-linear portion 31, that is, the first portion 223 of the second touch electrode 22 is located inside the outline curve 31, and the second portion 224 of the second touch electrode 22 is located outside of the outline curve 31. As shown in FIG. 7, the display region 02 includes a first edge 321, a second edge 322, and a third edge 323. The first edge 321 is perpendicular to the second edge 322. The third edge 323 intersects with the first edge 321 and the second edge 322. Any one of the second touch electrodes 22 overlaps with the third edge 323 of the display region 02, that is, the first portion 223 of the second touch electrode 22 is located at the inner side of the third edge 323, and the second portion 224 of the second touch electrode 22 is located at the outer side of the third edge 323.

The plurality of second touch electrodes 221 may further include a plurality of type I second touch electrodes 221 and a plurality of type II second touch electrodes 222. Each of the plurality of type I second touch electrodes 221 is arranged in the display region 02. A portion of each of the plurality of type II second touch electrodes 222 is arranged in the display region 02, and the other portion of each of the second type touch electrodes 222 is arranged in the non-display region 01. That is, as shown in FIG. 5, the type I second touch electrode can be designed locating at the inner side of the display region as needed, and the type II second touch electrode 222 overlaps with the above non-linear portion 31 or overlaps with at least a portion of the third edge 323. With such a design, the second touch electrode 222 having a smaller area extends towards the non-display region 01 to increase the area, so that the type II second touch electrode 222 is formed. Therefore, the type II second touch electrode 222 has a similar area as the type I second touch electrode 221, so that the type II second touch electrode 222 has a similar touch sensitivity as the type I second touch electrode 221, thus further ensuring the touch uniformity of the entire touch display panel. Meanwhile, the type II second touch electrode 22 having an area satisfying $0.85S1 \leqslant S2$ can be used as a type I second touch electrode 221 without changing its area, thus reducing process complexity.

In summary, the second touch electrode 22 partially overlaps with the profiled position cut corresponding to the display region 02, i.e., the second touch electrode 22 is also arranged at the edge position of the display region 02. Therefore, when the touch point is located at the edge of the display region, the touch function can be realized to maximize the touch effective area of the display region.

It should be noted that the above description for the positional relationship between the second touch electrode 22 and the edge of the display region 02 is not limited to the shape of the touch display panel mentioned above, and can alternatively be applied to other profiled touch display panels.

Further, the second touch electrode 22 has a different shape from the first touch electrode 21. It can be understood that the second touch electrode 22 is specially designed to fit the non-rectangular edge of the display region 02, so that the second touch electrode 22 has a different shape from the first touch electrode 21. In the embodiments of the present disclosure, the portion of the second touch electrode 22 near the edge of the display region 02 is parallel to the edge of the corresponding display region 02.

In the embodiments of the present disclosure, the plurality of first touch electrodes 21 has a same shape. Referring to FIGS. 2 to 7, in the present disclosure, the plurality of first touch electrodes 21 is all rectangular. It can be understood that the plurality of first touch electrodes 21 can be designed into other shapes as needed, as long as the shapes of the first touch electrodes are the same. In the embodiments of the present disclosure, the shape and the area of the plurality of first touch electrodes 21 are all the same, respectively. When the shape and the area of the first touch electrodes 21 are all the same, the process is simple and easy to realize, and the touch sensitivity at each of the positions of the first touch electrodes 21 can be ensured to be substantially the same.

Further, an area of the first touch electrode 21 is S1, an area of the second touch electrode 22 is S2, and S1 and S2 satisfy: $0.85S1 \leqslant S2 \leqslant 1.15S1$. When the area of the second touch electrode 22 and the area of the first touch electrode 21 meet the above formula, the uniformity of the touch sensitivity of the touch display panel can be effectively improved.

As shown in FIGS. 2, 4, 6 and 8, the plurality of first touch electrodes 21 has the same shape, and the plurality of second touch electrodes 22 are arranged in the display region 02. Further, the first touch electrode 21 includes a first side 210, and the second touch electrode 22 at least includes a second side 220. The first side 210 is parallel to the second side 220. The second side 220 has a greater length than the first side 210. As shown in FIG. 2, the length of the second side 220 of the second touch electrode 22 is approximately twice the length of the first side 210 of the first touch electrode 21, that is, the second touch electrode is formed by combining two profiled touch electrodes 221/222 adjacent upward and downward or two profiled touch electrodes 221/222 adjacent leftward and rightward, so that the area of the second touch electrode 22 obtained by combining the two profiled touch electrodes 221/222 having reduced area satisfies $0.85S1 \leqslant S2 \leqslant 1.15S1$. Such a design can effectively improve the uniformity of the touch sensitivity of the touch display panel. In addition, the number of the touch traces 40 connected to the touch electrodes 20 can be reduced, and the design for the connection through hole 50 between the touch traces 40 and the touch electrodes 20 can be optimized. In the embodiments of the present disclosure, an area of the first touch electrode 21 is S1, and an area of the second touch electrode 22 is S2, and $S1 \leqslant S2$.

As shown in FIGS. 3, 5 and 7, at least a part of the second touch electrode 22 includes a first portion 223 arranged in the display region 02 and a second portion 224 arranged in the non-display region 01, and the second touch electrode 22 includes a third side 220'. The third side 220' intersects with any one of the plurality of first touch electrodes 21. The third side 220' is arranged in the non-display region 01. Referring to FIGS. 3, 5 and 7, the first touch electrode 21 includes a fourth side, and the second touch electrode 22 at least includes a fifth side. The fourth side is parallel to the fifth side. Optionally, the third side is connected to the fifth side. The fifth side has a smaller length than the fourth side. As further illustrated in FIG. 3, the first touch electrode 21 includes a fourth side 210', and the second touch electrode 22 at least includes a fifth side 220". The fourth side 210' is parallel to the fifth side 220". The third side 220' is connected to the fifth side 220". The fifth side 220" has a smaller length than the fourth side 210'. With such a design, the second touch electrode 22 extends towards the non-display region 01 so as to appropriately increase the area of the profiled touch electrode 20, thereby improving the touch sensitivity of the edge of the display region 02, and effectively improving the uniformity of the touch sensitivity of the touch display panel. In the embodiments of the present disclosure, an area of the first touch electrode 21 is S1, and an area of the second touch electrode 22 is S2, and $S2 \leqslant S1$.

It should be noted that the above description for the shape and the area of the second touch electrode 22 is not limited to the shape of the touch display panel mentioned above, and can alternatively be applied to other profiled touch display panels.

Figure 11:
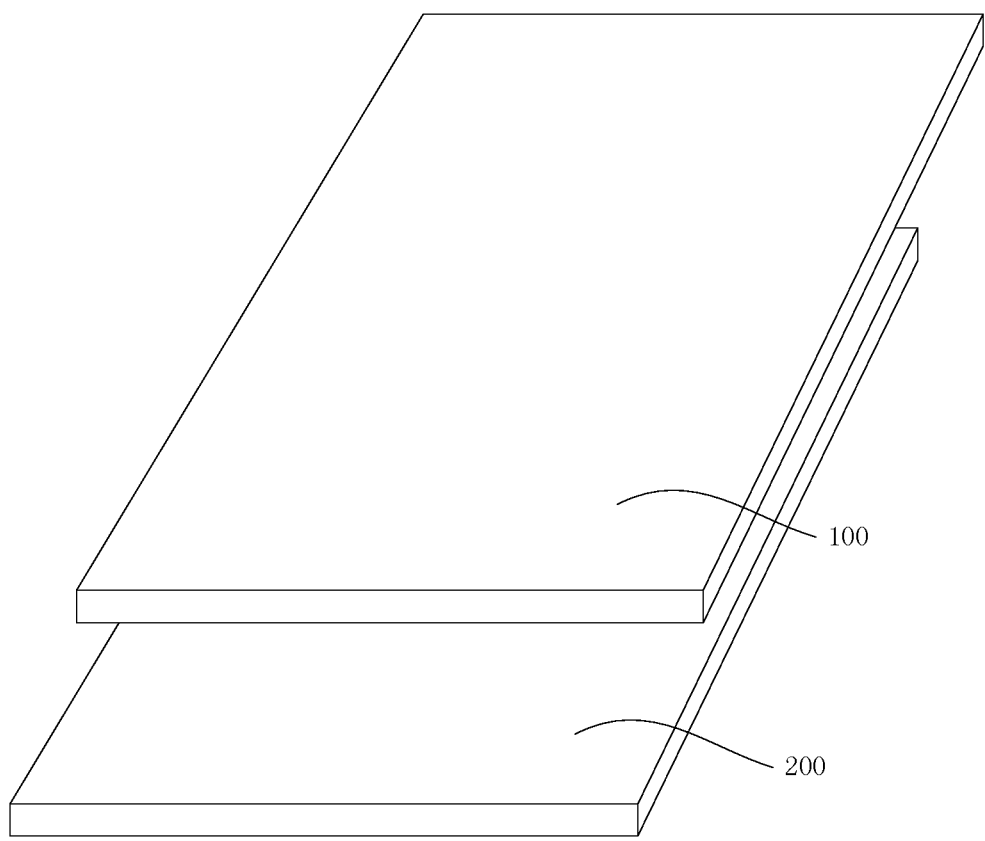
FIG. 11 is a schematic diagram showing a touch display device according to an embodiment of the present disclosure.

In addition, the present disclosure provides a touch display device. Referring to FIG. 11, FIG. 11 is a schematic diagram showing a touch display device according to an embodiment of the present disclosure. The display device includes the touch display panel 100 as provided in any one of the above embodiments. The touch display device can be a profiled touch display device which has good uniformity of the touch sensitivity. In the embodiments of the present disclosure, the touch display device can be a liquid crystal touch display device, and further includes, in addition to the touch display panel 100, a backlight module 200. In the embodiments of the present disclosure, the touch display device can also be an organic light-emitting touch display device or other touch display devices.

The above is a further detailed description of the present disclosure in conjunction with the specific preferred embodiments, and the specific implementation of the present disclosure is not limited to the description. For those skilled in the art which the present disclosure pertains to, a number of simple deductions or substitutions may be made without departing from the scope of the present disclosure.

What is claimed is:

1. A touch display panel, comprising:
a display region and a non-display region arranged on a periphery of the display region, wherein the display region has a non-rectangular shape;
a plurality of first touch electrodes arranged in the display region; and
a plurality of second touch electrodes arranged to be next to the non-display region;
wherein each of the plurality of second touch electrodes has a different shape from a shape of the plurality of first touch electrodes,
wherein an area of each of the plurality of first touch electrodes is S1, an area of at least one of the second touch electrodes of the plurality of second touch electrodes is S2, wherein S1 and S2 satisfy: $0.85 S1 \leqslant S2 \leqslant 1.15 S1$,
wherein each of the plurality of first touch electrodes comprises a first side, and each of the plurality of second touch electrodes at least comprises a second side adjacent to the first side along a column direction, and the second side of the second touch electrode has a greater length than the first side of one of the first touch electrode,
wherein for one second touch electrode of the plurality of second touch electrodes and two first touch electrodes of the plurality of first touch electrode that are adjacent along the column direction to the second touch electrode, an orthographic projection of a touch trace of the second touch electrode on a plane of the display panel is located, along a row direction, between orthographic projections of touch traces of the two first touch electrodes on the plane of the display panel, and the one second touch electrode comprises a third side which is aligned along the column direction with a fourth side of one of the two first touch electrodes.

2. The touch display panel according to claim 1, wherein each of the plurality of first touch electrodes has a same shape.

3. The touch display panel according to claim 2, wherein the second side is parallel to the first side.

4. The touch display panel according to claim 3, wherein the plurality of second touch electrodes is arranged in the display region.

5. The touch display panel according to claim 4, wherein $S1 \leqslant S2$.

6. The touch display panel according to claim 2, wherein at least one of the plurality of second touch electrodes comprises a first portion arranged in the display region and a second portion arranged in the non-display region.

7. The touch display panel according to claim 2, wherein the plurality of second touch electrodes comprises a first type and a second type;
wherein the first type includes the second touch electrodes each having a full area inside the display region; and
wherein the second type includes the second touch electrodes each having a portion inside the display region and another portion in the non-display region.

8. The touch display panel according to claim 1, wherein one of the plurality of second touch electrodes comprises a third side, an extending direction of the third side is not parallel to any side of one of the plurality of first touch electrodes, and the third side is arranged in the non-display region.

9. The touch display panel according to claim 8, wherein each of the plurality of first touch electrodes comprises a fourth side, and each of the plurality of second touch electrodes at least comprises a fifth side parallel to the fourth side of the plurality of first touch electrodes, and the fifth side of the plurality of second touch electrodes has a smaller length than the fourth side of the plurality of second touch electrodes.

10. The touch display panel according to claim 9, wherein the third side is connected to the fifth side.

11. The touch display panel according to claim 8, wherein $S2 \leqslant S1$.

12. The touch display panel according to claim 1, wherein the plurality of first touch electrodes and the plurality of second touch electrodes are configured to receive a touch sensing signal during a touch phase.

13. The touch display panel according to claim 1, further comprising a common electrode layer, a pixel electrode layer and a liquid crystal layer, wherein the common electrode layer comprises a plurality of common electrode blocks, the pixel electrode layer comprises a plurality of pixel electrodes, and the liquid crystal layer comprises liquid crystal molecules;
wherein during a display phase, the liquid crystal molecules are driven by an electric field formed by the plurality of common electrode blocks and the plurality of pixel electrodes to deflect; and
wherein during a touch phase, at least a part of the plurality of common electrode blocks is shared as first touch electrodes, and a part of the plurality of common electrode blocks is shared as second touch electrodes.

14. The touch display panel according to claim 13, wherein an edge of the display region comprises a curvy portion, and each of the plurality of second touch electrodes is either next to the curvy portion or overlaps with a portion of the curvy portion.

15. The touch display panel according to claim 13, wherein the display region comprises a first edge, a second edge and a third edge; wherein the first edge and the second edge are arranged perpendicular to each other, and the third edge intersects with both the first edge and the second edge; and wherein the plurality of second touch electrodes each is either next to the third edge or overlaps with at least a portion of the third edge.

16. The touch display panel according to claim 1, wherein the first portion and the second portion of a same second type of electrode share a same touch trace.

17. The touch display panel according to claim 1, wherein an orthographic projection of a touch trace connected to the second touch electrode on a plane of the display panel does not overlap the first touch electrodes.

18. The touch display panel according to claim 17, wherein the touch trace connected to the second touch electrode extends along a gap between adjacent first touch electrodes.

19. A touch display device, comprising a touch display panel, wherein the touch display panel comprises:
a display region and a non-display region arranged on a periphery of the display region, wherein the display region has a non-rectangular shape;
a plurality of first touch electrodes arranged in the display region; and
a plurality of second touch electrodes arranged to be next to the non-display region;
wherein each of the plurality of second touch electrodes has a different shape from a shape of the plurality of first touch electrodes,
wherein an area of each of the plurality of first touch electrodes is S1, an area of at least one of the second touch electrodes of the plurality of second touch electrodes is S2, wherein S1 and S2 satisfy: $0.85S1 \leq S2 \leq 1.15S1$,
wherein each of the plurality of first touch electrodes comprises a first side, and each of the plurality of second touch electrodes at least comprises a second side adjacent to the first side along a column direction, and the second side of the second touch electrode has a greater length than the first side of one of the first touch electrode,
wherein for one second touch electrode of the plurality of second touch electrodes and two first touch electrodes of the plurality of first touch electrode that are adjacent along the column direction to the second touch electrode, an orthographic projection of a touch trace of the second touch electrode on a plane of the display panel is located, along a row direction, between orthographic projections of touch traces of the two first touch electrodes on the plane of the display panel, and the one second touch electrode comprises a third side which is aligned along the column direction with a fourth side of one of the two first touch electrodes.

20. A touch display panel, comprising:
a display region and a non-display region arranged on a periphery of the display region, wherein the display region has a non-rectangular shape;
a plurality of first touch electrodes arranged in the display region; and
a plurality of second touch electrodes arranged to be next to the non-display region;
wherein each of the plurality of second touch electrodes has a different shape from a shape of the plurality of first touch electrodes,
wherein an area of each of the plurality of first touch electrodes is S1, an area of at least one of the second touch electrodes of the plurality of second touch electrodes is S2, wherein S1 and S2 satisfy: $0.85S1 \leq S2 \leq 1.15S1$,
wherein at least one of the plurality of second touch electrodes comprises a first portion arranged in the display region and a second portion arranged in the non-display region,
wherein the plurality of second touch electrodes comprises a first type of electrode and a second type of electrode,
wherein each electrode of the first type has a full area inside the display region,
wherein each electrode of the second type integrally protrudes from the display region to the non-display region and has a first portion inside the display region and a second portion in the non-display region,
wherein each electrode of the second type is adjacent, along an edge, to one electrode of the first type in a column direction of the plurality of second touch electrodes and adjacent, along an edge, to another electrode of the first type in a row direction of the plurality of second touch electrodes, for the electrode of the second type and the electrode of the first type that are adjacent to each other in the column direction, orthographic projections of the adjacent edges along the row direction at least partially overlap each other, and for the electrode of the second type and the electrode of the first type that are adjacent to each other in the row direction, orthographic projections of the adjacent edges along the column direction at least partially overlap each other,
wherein each of the plurality of first touch electrodes and the plurality of second touch electrodes is electrically connected to at least one touch trace, and an orthographic projection of the at least one touch trace electrically connected to the second type of electrode on a plane of the touch display panel is at least partially located within the display region, and
wherein an orthographic projection of the touch trace connected to the second touch electrode on a plane of the display panel does not overlap the first touch electrodes.

* * * * *